May 11, 1965 L. A. ATTERMEYER 3,182,521
SUPPORT MECHANISM FOR MOVABLE MACHINE TOOL MEMBER
Filed March 15, 1963 5 Sheets-Sheet 5

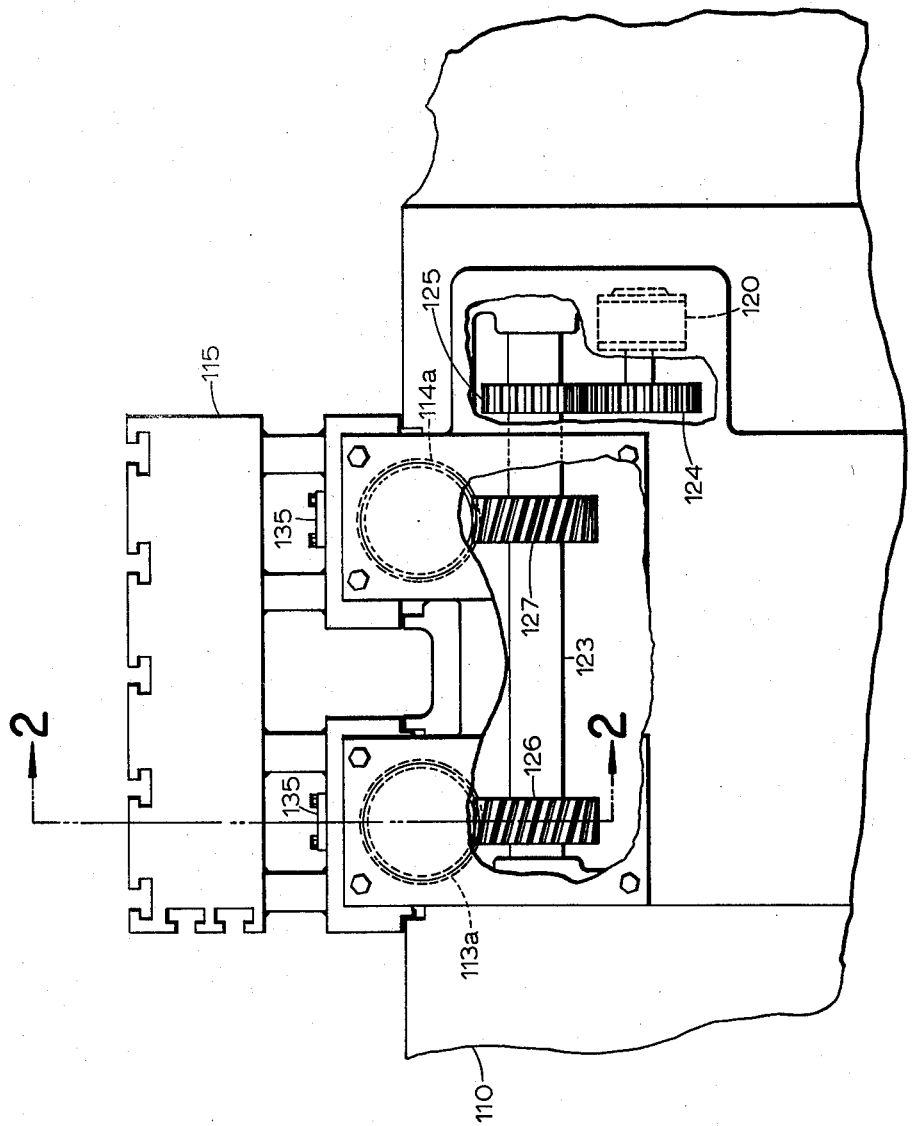

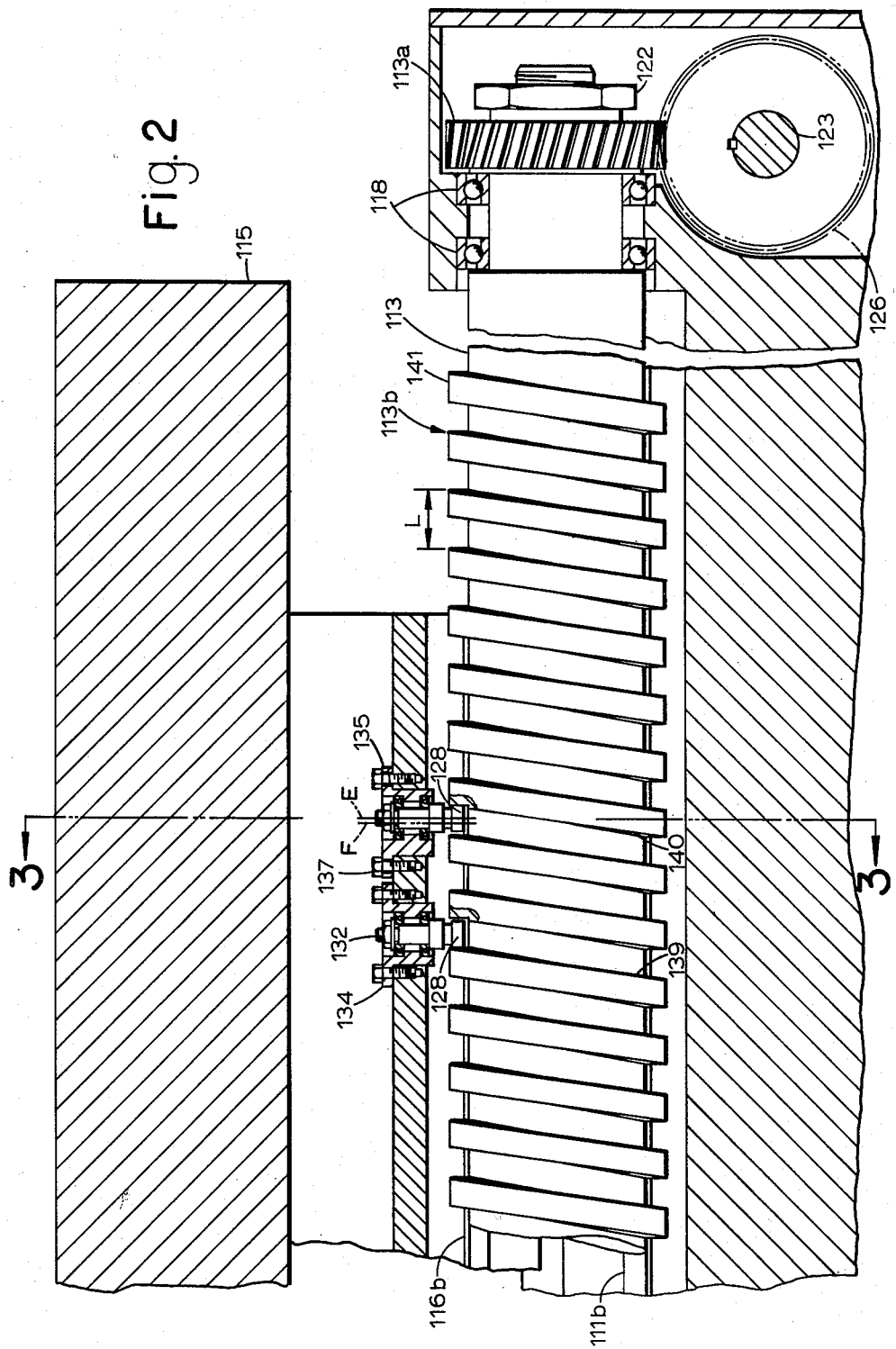

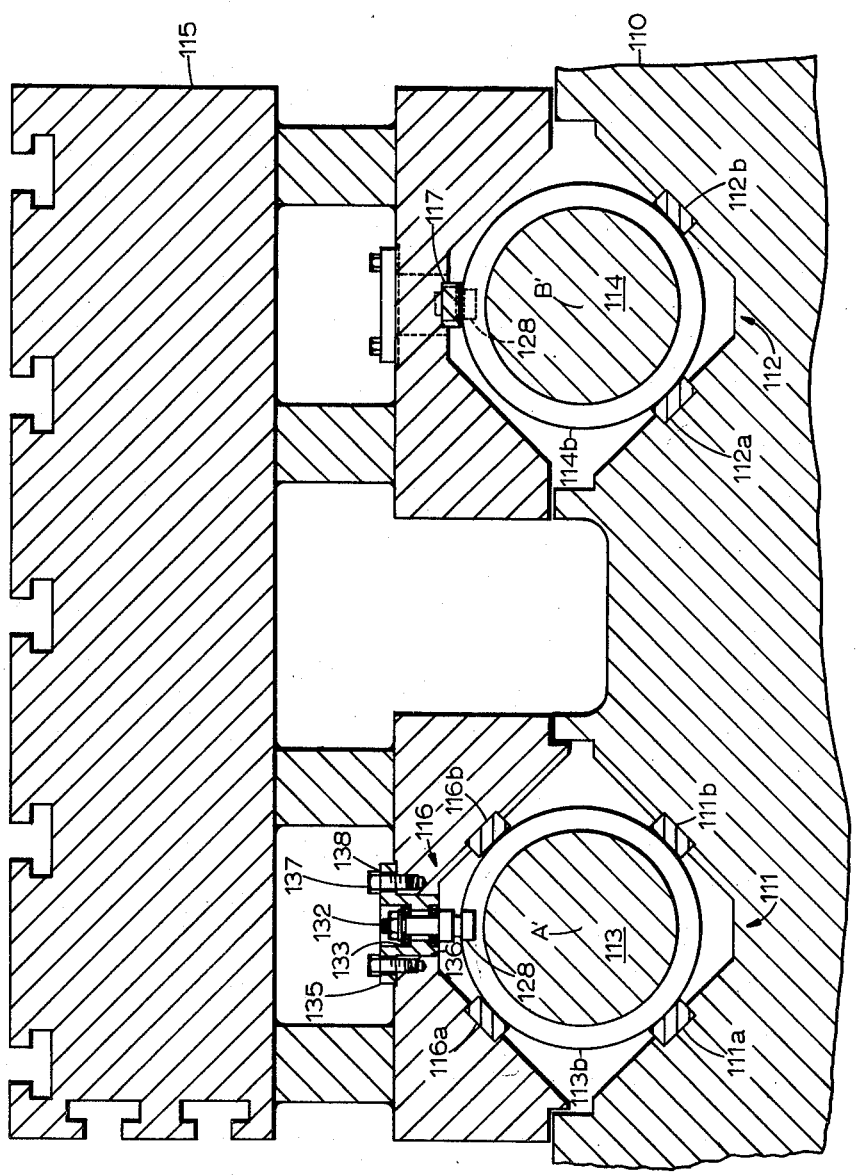

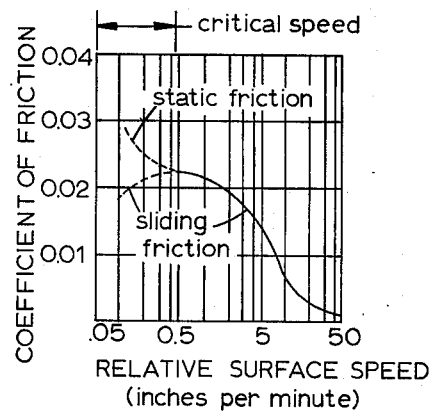
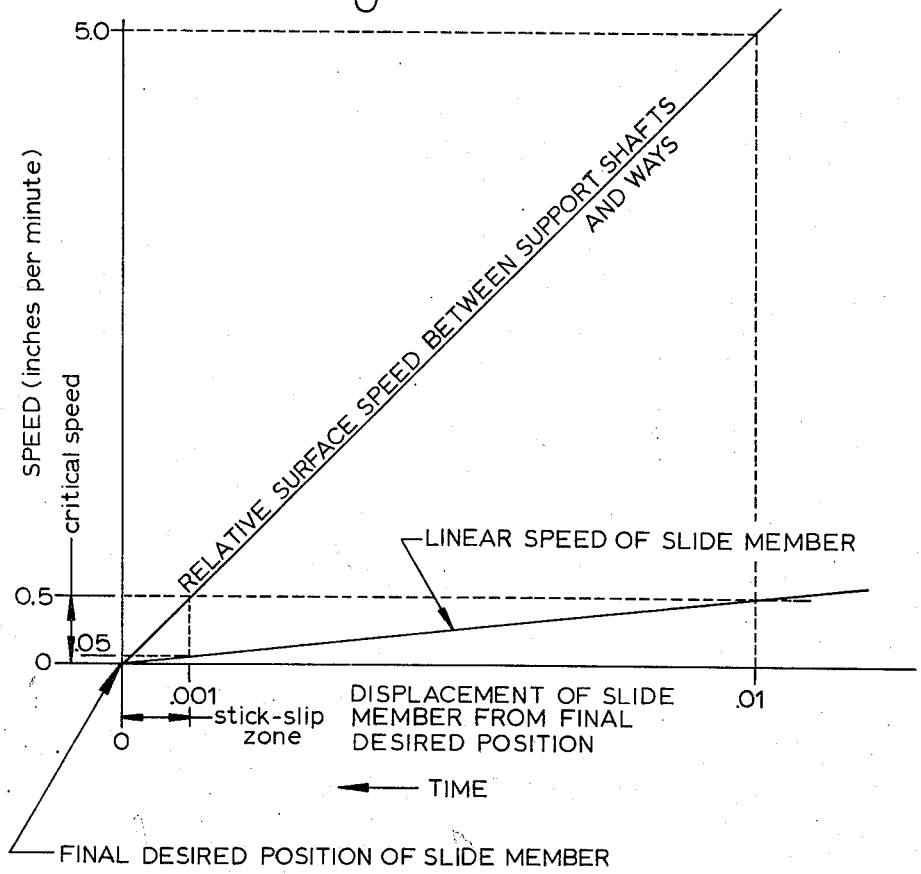

United States Patent Office 3,182,521
Patented May 11, 1965

3,182,521
SUPPORT MECHANISM FOR MOVABLE MACHINE
TOOL MEMBER
Lawrence A. Attermeyer, Cincinnati, Ohio, assignor to
The Cincinnati Milling Machine Co., Cincinnati, Ohio,
a corporation of Ohio
Filed Mar. 15, 1963, Ser. No. 265,500
5 Claims. (Cl. 74—424.8)

The present invention relates to machine tool mechanism for support and movement of a machine tool slide, such as a table, carriage, wheelhead, or other movable member, relative to the member on which it is mounted, which mechanism is particularly suitable for precise positioning of the movable member.

When the speed of a surface of a movable machine tool member on a support surface, or way, is very low, as in beginning or terminating movement thereon, a jumpy motion, due to an alternate sticking and slipping of the surfaces, occurs. This behavior, sometimes called stick-slip, is well known in the machine tool industry and arises from the difference between the greater resistance to motion of one surface on another produced by static friction and the lower resistance to motion between these surfaces produced by sliding friction. This phenomenon is discussed in some detail in an article entitled "Stick-Slip" in the July 1960 The Tool Engineer, to which reference is herein made.

In a typical machine tool construction, a movable machine tool slide member, such as a table or carriage, has a slide surface mounted on flat ways on a base. A screw, journaled in the base, is threadedly engaged with the movable member to effect movement thereof along the ways when the screw is rotated. The speed of the slide surface on the ways is the same as the speed of the movable member, and stick-slip is likely to occur when movement of the slide member is begun, and when movement of the slide member is slowed down for stopping. In this conventional construction, the friction between the slide surface of the movable member and the ways occurs in the direction of movement but in a sense to oppose that movement. When the movable member sticks on the way, the driving force builds up until the static friction is overcome. When the driving force breaks the movable member loose from the ways, the movable member, resisted only by the lower sliding friction, tends to lunge forward. Any alternate lunging and sticking of the movable member as it slows down in its approach to a desired position seriously affects the precise positioning of that member.

One solution heretofore proposed to overcome the stick-slip problem in machine tools is based on the elimination of static friction by providing continuous motion between the supporting surface and the surface of the movable member in supporting engagement therewith. This is done by supporting the movable member solely through two or more continuously rotating shafts. With this construction, it is only the very low sliding friction force which resists movement of the movable member, whether that member is stationary or moving, and alternate sticking and slipping of the movable member is eliminated.

This proposed elimination of static friction entails the necessity of continuously rotating the shafts which define the ways while the machine is in operation, even though the movable member may be stationary during a considerable portion of the machine operating cycle. Moreover, the movable member, when stationary, is supported by rotating shafts and any irregularities in the shafts will cause vibration in the member supported. The greatest objection, however, to the elimination of static friction is the lack of stability of the movable member as it reaches a selected position. The sliding friction stemming from the use of rotating shafts produces a very low resistance to movement compared to the resistance of static friction, and, as a result, when the movable member reaches a desired position, the ways defined by the rotating shafts produce a force resisting movement insufficient to assure stability (that is, complete immobility) of the movable member at that position.

In the mechanism of the present invention, static friction between the movable member and the supporting member is not eliminated, and consequently the stick-slip phenomenon is not eliminated, but the undesirable effect of stick-slip, as in positioning the movable member, is greatly reduced. Moreover, any tendency for undesired movement of the movable member from the position to which it is moved is resisted by static friction so that a stable positioning is provided. In brief, the movable member is supported through a plurality of parallel shafts, but these shafts are rotated only during movement of the movable member. Preferably, one or more of these rotatable support shafts define power screws which effect movement of the slide member when the shafts are rotated so that these shafts combine the support and driving function, obviating the need for separate supporting and driving members.

Unlike the conventional machine tool construction where the speed of the slide surface on the ways is the same as the speed at which the movable member advances, in the present invention the relative surface speed between the supporting shafts and the slide surface in supporting engagement therewith is substantially greater than the advancing speed of the movable member. Unlike the previously proposed construction using continuously rotating shafts, in the present invention relative surface movement between the supporting shafts and the slide surface in supporting engagement therewith occurs only during movement of the movable member and terminates simultaneously with the cessation of that movement. Both of these characteristics are important.

If, for example, the support shafts define power screws in driving engagement with the movable member, the relative movement between the surface of the shafts and the slide surface in supported engagement therewith (which depends on the outer diameters of the shafts and the speed of rotation of the shafts) is not only substantially greater than the advancing movement of the movable member, but is directly related to the speed of advance (in a predetermined ratio related to the lead of the screw). If stick-slip occurs below, say, a surface speed of 0.5 inch per minute, the movement of the movable member in a conventional machine tool construction will become erratic when the speed of the movable member falls below this critical speed in its approach to a selected position, which must occur some finite distance, say .01 inch, from the desired position. With the movable slide member driven by power screws which define support shafts, the surface speed between the shafts and the slide surface in supported engagement therewith is greater and in direct predetermined ratio, say 10/1, to the speed of advance of the movable slide member, and stick-slip will not occur until the movable member is down to an approach speed of .05 inch per minute and substantially closer than .01 inch to the final desired slide position. Since the supporting shafts which define power screws stop rotation as the movable member stops, the static friction between the shafts and the movable member supported thereby resists movement of the movable member from this final position.

In the preferred form of the invention, the power screws, which provide complete support for the movable member, are journaled in the base and are supported along their entire length by fixed ways in the base to assure rigidity of the screws, and hence rigidity of the movable member they support. Driving engagement between each support screw and the movable member is effected by two axially spaced rollers, mounted in the movable member, for minimum power loss in the drive. These rollers are axially adjustable relative to each other to take out backlash in the drive so that positive, controlled movement of the movable member can be achieved.

It is, therefore, one object of the present invention to minimize the undesirable effect of stick-slip on a movable machine tool member without affecting the stability of the member.

It is another object of the present invention to support a movable member through shafts which rotate in coordination with the drive of the table.

It is yet another object of the present invention to provide, in mounting a movable member in a machine tool, a relative surface speed between support shafts and the surface in supporting engagement therewith substantially greater than, and in direct proportion to, the speed of the movable member.

It is yet another object of the present invention to combine the supporting and driving function in the same members in mounting a movable member in a machine tool.

It is yet another object of the present invention to provide, for mounting a movable member in a machine tool, support shafts which define power screws to drive said movable member.

It is yet another object of the present invention to provide an efficient drive system, without backlash, for a movable machine tool member.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a fragmentary view in elevation of a machine tool incorporating the present invention;

FIG. 2 is an enlarged view taken on the line 2—2 of FIG. 1;

FIG. 3 is a view taken on the line 3—3 of FIG. 2;

FIG. 4 is graph illustrating the relationship of the coefficient of friction between a slide surface and a support surface to the relative speed between these surfaces; and FIG. 5 is a graph illustrating the relative speed, in the present invention, between the support and slide surfaces as compared to the speed of the movable member;

Figure 7:
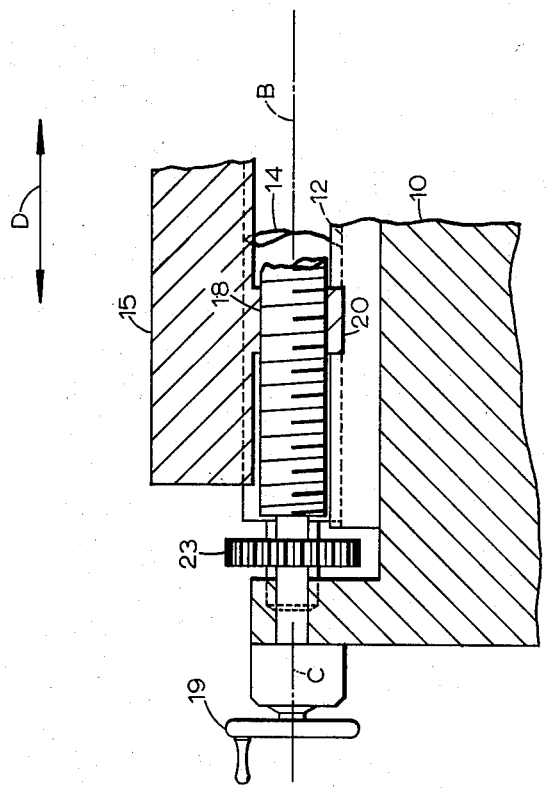
FIG. 7 is a view taken on the line 7—7 of FIG. 6.
Figure 6:
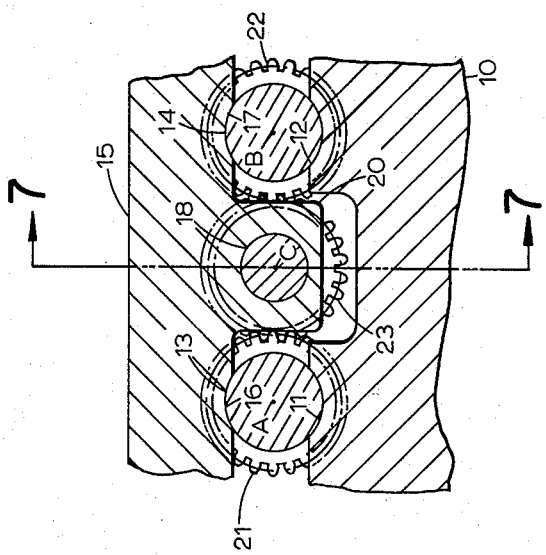
FIG. 6 is a cross-sectional view of another embodiment of the present invention.

In the embodiment of the present invention shown in FIGS. 6 and 7, a base member 10 has a pair of straight, elongated, parallel, spaced apart, ways 11 and 12. Ways 11 and 12 are shaped to receive the cylindrical shafts 13 and 14 which are journaled in the base member for rotation about parallel axes A and B. A slide member 15, which may be a table, carriage, wheelhead, or any other movable machine tool member, has parallel ways 16 and 17, which are spaced apart as the ways 11 and 12, and which are in supported engagement with the shafts 13 and 14. Thus the table member 15, which is held in spaced relation to the base member 10, is supported solely through the shafts 13 and 14. A screw 18, having a handwheel 19 connected thereto at one end, is journaled in the base for rotation about an axis C parallel to axes A and B, and is secured against longitudinal movement in the base. The screw 18 is in threaded engagement with a depending portion 20 of the table member so that, on rotation of the screw by handwheel 19, the table member is moved linearly along the shafts 13 and 14 in a direction indicated by arrow D and parallel to the axes A, B, and C of the shafts and screw. A gear 21 secured to shaft 13, and a gear 22 secured to shaft 14, are both engaged with gear 23 secured on screw 18 so that the shafts 13 and 14 rotate when, and only when, screw 18 is rotated by handwheel 19. Thus the shafts 13 and 14 rotate in unison with movement of table member 15, starting and stopping at the same instant the table member is started and stopped.

In the preferred embodiment of the invention, shown in FIGS. 1, 2, and 3, the driving and supporting function are combined, in the same members, eliminating the need for separate driving and supporting members. In this embodiment, as shown best in FIG. 3, the base member 110 has a pair of flat, straight elongated, wear strips 111a, 111b defining one way, indicated generally at 111, and has a second pair of like wear strips 112a, 112b defining a second way, indicated generally at 112, which is parallel to and spaced from the way 111. Parallel shafts 113 and 114, which are rotatable in the base but not movable axially relative thereto, are journaled in base bearings 118 and each has a helical gear, 113a, 114a, respectively secured at one end by nut 122, as shown in FIGS, 1 and 2. The shafts 113 and 114 each have a single thread 113b, 114b, respectively, and the peripheries 141 of the threads are in supporting engagement with ways 111, 112, respectively. A slide member 115 has way strips 116a, 116b which define one way, indicated at 116, and a single wear strip 117 which defines a second way parallel to and spaced from way 116. The ways 116, 117 are in supported engagement with the peripheries 141 of shaft threads 113b, 114b, respectively, and the slide member 115, which is in spaced relation to base member 110, is supported solely by the parallel shafts 113, 114.

A motor 120, as shown in FIG. 1, is mounted in the base and drives, through gears 124, 125, a cross shaft 123 journaled in the base. The cross shaft has spaced helical gears 126, 127 secured thereon which are engaged, respectively, with helical gears 113a, 114a. Thus the shafts 113, 114 rotate in unison when the motor runs, and not only define supporting shafts for the table member, but also define power screws therefor. Linear movement of the table 115 parallel to the shafts 113 and 114 is derived from the rotation of the threaded shafts through two pairs of rollers 128 journaled in the table member 115 which establish driving engagement of the table with the threaded shafts, one pair of rollers engaged with each threaded shaft.

Each roller 128 is defined by the integral cylindrical end of a roller shaft 132. Each of the roller shafts 132 is carried in bearings 133 secured in bushings which are carried in the table member above the shafts. Two of the rollers are carried in bushings 134, 135 above shaft 113 and axially spaced with respect to shaft 113. The internal bore (and central axis E thereof) of bushing 135 is eccentric relative to the outer diameter thereof and hence eccentric relative to the bore 136, having a central axis F, in which the bushing 135 is received. When bolts 137, which are received in arcuate slots 138 of the flange of bushing 135, are loosened, the bushing 135 can be rotated to adjust the axial spacing between the rollers. The two rollers 128 engaged with shaft 114 are mounted identically to the two rollers 128 engaged with shaft 113. To assure elimination of backlash between the slide member 115 and the threaded shafts, the axial spacing between the two rollers engaged with threaded shafts 113 is adjusted so that one roller, say the roller carried by bushing 134, is engaged with one face 139 of the thread 113a, and the roller carried by bushing 135 is engaged with the opposite face 140 of the thread. The rollers over shaft 114 are similarly adjusted. It will be noted that the threads 113b, 114b are square with faces 139, 140 perpendicular to shafts 113, 114, respectively, for line contact with the cylindrical rollers 128.

In both embodiments of the invention disclosed herein, the speed of the support shaft surface relative to the base and slide ways will be considerably greater than, and in direct proportion to, the linear speed of the slide member. For example, in the time taken for one revolution of support shafts 113, 114, the thread peripheries will travel a distance substantially equal to the circumference of the thread peripheries relative to the ways while the slide will move only a distance L equal to the lead on the threaded shafts. Similarly, during one revolution of screw 18 (which will produce one revolution of shafts 13 and 14 if gears 21, 22, and 23 have like diameters), the slide member 15 will advance linearly a distance equal to the lead on the screw while the surfaces of shafts 13 and 14 on ways 11, 16 and 12, 14 will move a distance substantially equal to the circumference of the shafts.

The fact that the surfaces of the support shafts move at a substantially greater speed than linear movement of the slide member 15, but in direct proportion thereto, is important in bringing the slide member to rest at a desired precise position. The chart of FIG. 4, which has an abscissa to a logarithmic scale, shows the relation between the coefficient of friction and relative surface speed in a typical machine tool construction. The upper dotted branch indicates static friction, the lower dotted branch line indicates sliding friction, and, in the critical speed zone where both these frictions are shown, the contacting surfaces will alternately stick and slide. The chart of FIG. 5, to illustrate the present invention, assumes a critical speed range (where stick-slip is likely to occur) between 0 and 0.5 inch per minute and a ratio of 10 to 1 between relative surface speed (of the shafts to the ways) and the linear speed of the slide member. When the slide member, during deceleration (assumed constant), reaches the critical speed of 0.5 inch per minute, the slide member is some finite distance of, say, .01 inch from the desired final position. But, in the present invention, the relative surface speed between the support shafts and the ways is, at that time, 5.0 inches per minute, far above the critical stick-slip speed. It is only when the slide member is one-tenth this distance, or .001 inch, from the final position, moving at one-tenth the critical speed, or at .05 inch per minute, that the relative speed between the shaft surfaces and ways reaches the critical speed of 0.5 inch per minute where stick-slip is likely to occur. Thus, the effect of stick-slip in positioning the slide member is very much less than it would be if the slide were supported directly by the base member. However, as the slide stops, the rotation of the shafts stop, and any tendency to move the slide member from its final position is resisted by static friction which renders the slide member stable in the selected position.

What is claimed is:
1. In a machine tool
 (a) a first machine tool member,
 (b) a plurality of elongated parallel support shafts carried by said first member, at least one of said support shafts threaded and secured against longitudinal movement relative to said first member,
 (c) a second machine tool member in supported engagement with said support shafts and in spaced relation to said first member,
 (d) a pair of rollers journaled in said second member and in driving engagement with said threaded support shaft for relative movement parallel to said support shafts between said first and second members on rotation of said threaded support shaft, said rollers urged against opposite thread faces on said threaded shaft,
 (e) and means to rotate all said support shafts in unison.
2. In a machine tool
 (a) a base member having a pair of spaced parallel ways,
 (b) a pair of elongated support shafts journaled in said base member and supported, respectively, on said ways, said support shafts threaded and secured against longitudinal movement relative to said base member,
 (c) a slide member having a pair of spaced parallel ways received, respectively, on said shafts for support of the slide member in spaced relation to the base member,
 (d) means effecting driving engagement of said slide member with said threaded support shafts for movement of said slide member along said support shafts on rotation of the shafts.
 (e) and means to rotate said shafts in unison.
3. In a machine tool
 (a) a base member having a pair of spaced parallel ways,
 (b) a pair of elongated support shafts journaled in said base member and supported, respectively, on said ways, said support shafts threaded and secured against longitudinal movement relative to said base member,
 (c) a slide member having a pair of spaced parallel ways received, respectively, on said shafts for support of the slide member in spaced relation to the base member,
 (d) two pairs of rollers journaled in said slide member, each pair of rollers in driving engagement with one of said threaded support shafts, the rollers of each pair urged against opposite thread faces,
 (e) and means to rotate said support shafts in unison.
4. In a machine tool
 (a) a first machine tool member,
 (b) a plurality of elongated parallel support shafts carried by said first member, at least one of said support shafts threaded and secured against longitudinal movement relative to said first member,
 (c) a second machine tool member in engagement with said support shafts and in spaced relation to said first member, the weight of one of said members transmitted through the support shafts to the other member,
 (d) a pair of rollers journaled in said second member and in driving engagement with said threaded support shaft for relative movement parallel to said support shafts between said first and second members on rotation of said threaded support shaft, said rollers urged against opposite thread faces on said threaded shaft,
 (e) and means to rotate all said support shafts in unison.
5. In a machine tool
 (a) a base member having a pair of spaced parallel ways,
 (b) a slide member having a pair of spaced parallel ways in spaced relation to the ways on the base member,
 (c) a pair of elongated threaded support shafts journaled in one of said members and engaged with the pairs of ways, respectively, of both members, the weight of the slide member transmitted through the support shafts to the base member,
 (d) means effecting driving engagement of said slide member with said threaded support shafts for movement of said slide member along said support shafts on rotation of the shafts,
 (e) and means to rotate said shafts in unison.

References Cited by the Examiner
UNITED STATES PATENTS 2,742,791 4/56 Hauber.
2,947,535 8/60 Crosby _____ 74—424.8 XR DON A. WAITE, *Primary Examiner.*